(12) United States Patent
Khazeni et al.

(10) Patent No.: US 10,061,437 B2
(45) Date of Patent: Aug. 28, 2018

(54) ACTIVE CANCELING OF DISPLAY NOISE IN SIMULTANEOUS DISPLAY AND TOUCH SENSING USING AN IMPULSE RESPONSE

(71) Applicant: SYNAPTICS INCORPORATED, San Jose, CA (US)

(72) Inventors: Kasra Khazeni, San Jose, CA (US); Joseph Kurth Reynolds, Alviso, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/871,448

(22) Filed: Sep. 30, 2015

(65) Prior Publication Data

US 2017/0090671 A1    Mar. 30, 2017

(51) Int. Cl.
*G06F 3/041* (2006.01)
*G06F 3/044* (2006.01)

(52) U.S. Cl.
CPC .......... *G06F 3/0418* (2013.01); *G06F 3/044* (2013.01); *G06F 3/0412* (2013.01)

(58) Field of Classification Search
CPC ...... G06F 3/041; G06F 3/0412; G06F 3/0416; G06F 3/0418; G06F 3/044
See application file for complete search history.

(56) References Cited

U.S. PATENT DOCUMENTS

| | | |
|---|---|---|
| 7,417,441 B2 | 8/2008 | Reynolds |
| 7,583,092 B2 | 9/2009 | Reynolds et al. |
| 2008/0062148 A1 | 3/2008 | Hotelling et al. |
| 2010/0001973 A1 | 1/2010 | Hotelling et al. |
| 2010/0193257 A1 | 8/2010 | Hotelling et al. |
| 2010/0194695 A1 | 8/2010 | Hotelling et al. |
| 2011/0284949 A1 | 11/2011 | Meng et al. |
| 2011/0298746 A1* | 12/2011 | Hotelling .............. G06F 3/0418 345/174 |
| 2012/0182251 A1 | 7/2012 | Krah |
| 2013/0063395 A1* | 3/2013 | Byun ...................... G06F 3/044 345/174 |

(Continued)

OTHER PUBLICATIONS

Phillippe Lambinet, FOGALE nanotech, presentation materials dared, May 22, 2013, France.

*Primary Examiner* — Keith Crawley
(74) *Attorney, Agent, or Firm* — Patterson + Sheridan, LLP

(57) ABSTRACT

Techniques for removing display-based corrupting components from a capacitive sensing signal when display and capacitive sensing is performed at or nearly at the same time. A routing carrying display related signals (e.g., a source signal for sub-pixel updating) may induce a corrupting current into a routing for carrying capacitive sensing signals. This corrupting current would reduce the ability to determine presence of an input object via the sensing signal. Therefore, the corrupting signal is effectively removed from a signal received from a sensor electrode when driven for sensing. The corrupting component may be removed either in analog or digitally. In analog, the corrupting component is removed via a tunable capacitance. Digitally, a corrupting component is calculated as an impulse response convolved with the source driver voltage. This corrupting component is then subtracted from a digital value output by the sensing circuitry to obtain a "clean" value.

16 Claims, 9 Drawing Sheets

(56) References Cited

U.S. PATENT DOCUMENTS

| | | |
|---|---|---|
| 2013/0215075 A1 | 8/2013 | Lee et al. |
| 2013/0271426 A1* | 10/2013 | Yumoto .................. G06F 3/041 |
| | | 345/174 |
| 2013/0321296 A1 | 12/2013 | Lee et al. |
| 2015/0091843 A1 | 4/2015 | Ludden |
| 2015/0103046 A1* | 4/2015 | Liu ......................... G06F 3/044 |
| | | 345/174 |
| 2015/0123929 A1* | 5/2015 | Bang .................... G06F 3/0488 |
| | | 345/173 |
| 2015/0220206 A1* | 8/2015 | Knausz ................. G06F 3/0418 |
| | | 345/174 |
| 2017/0038873 A1* | 2/2017 | Shang .................. G06F 3/0412 |

\* cited by examiner

ACTIVE CANCELING OF DISPLAY NOISE IN SIMULTANEOUS DISPLAY AND TOUCH SENSING USING AN IMPULSE RESPONSE

BACKGROUND

Field of the Disclosure

Embodiments generally relate to input sensing and, in particular, to cancelling display noise in simultaneous display and touch sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Proximity sensor devices may include display elements that are updated simultaneously with performing proximity sensing. A routing carrying display related signals (e.g., a source signal for sub-pixel updating) to the display elements may induce a corrupting current into a routing for carrying proximity sensing signal. This corrupting current would reduce the ability to determine presence of an input object via the sensing signal.

SUMMARY

A processing system configured for simultaneously updating a display and performing capacitive sensing is provided. The processing system includes a source driver configured to drive a source line with a source driver signal during a first time period and to receive resulting signals on a routing trace coupled to a sensor electrode during a second time period that at least partially overlaps with the first time period, the routing trace and the source line being routed proximate each other. The processing system also includes an interference remover configured to remove source driver effects in the resulting signals that exist due to driving the source line with the source driver signal, by removing an interference signal that is generated based on the source driver signal.

An input device configured for simultaneously updating a display and performing capacitive sensing is provided. The input device includes a sensor electrode coupled to a routing trace, a display element coupled to a source line, the source line and the routing trace being routed proximate each other, and a processing system coupled to the routing trace and the source line. The processing system includes a source driver configured to drive a source line with a source driver signal during a first time period and to receive resulting signals on a routing trace coupled to a sensor electrode during a second time period that at least partially overlaps with the first time period, the routing trace and the source line being routed proximate each other. The processing system also includes an interference remover configured to remove source driver effects in the resulting signals that exist due to driving the source line with the source driver signal, by removing an interference signal that is generated based on the source driver signal.

A method for simultaneously updating a display and performing capacitive sensing is provided. The method includes driving a source line with a source driver signal during a first time period. The method also includes receiving resulting signals on a routing trace coupled to a sensor electrode during a second time period that at least partially overlaps with the first time period, the routing trace and the source line being routed proximate each other. The method further includes removing source driver effects in the resulting signals that exist due to driving the source line with the source driver signal, by removing an interference signal that is generated based on the source driver signal.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide techniques for removing display-based corrupting components from a capacitive sensing signal when display and capacitive sensing is performed at or nearly at the same time. A routing carrying display related signals (e.g., a source signal for sub-pixel updating) may induce a corrupting current into a routing for carrying capacitive sensing signals. This corrupting current would reduce the ability to determine presence of an input object via the sensing signal. Therefore, a corrupting component is removed from a signal received from a sensor electrode when driven for sensing. The corrupting component may be removed either in analog or digitally. In analog, the corrupting component is removed by generating an inverse corrupting current signal via a tunable capacitance and drawing the corrupting current from the signal received from the sensor electrode via this inverse corrupting current signal. Digitally, a corrupting component is calculated as an impulse response convolved with the source driver voltage. This corrupting component is then subtracted from a digital value output by the sensing circuitry to obtain a "clean" value.

Figure 1:
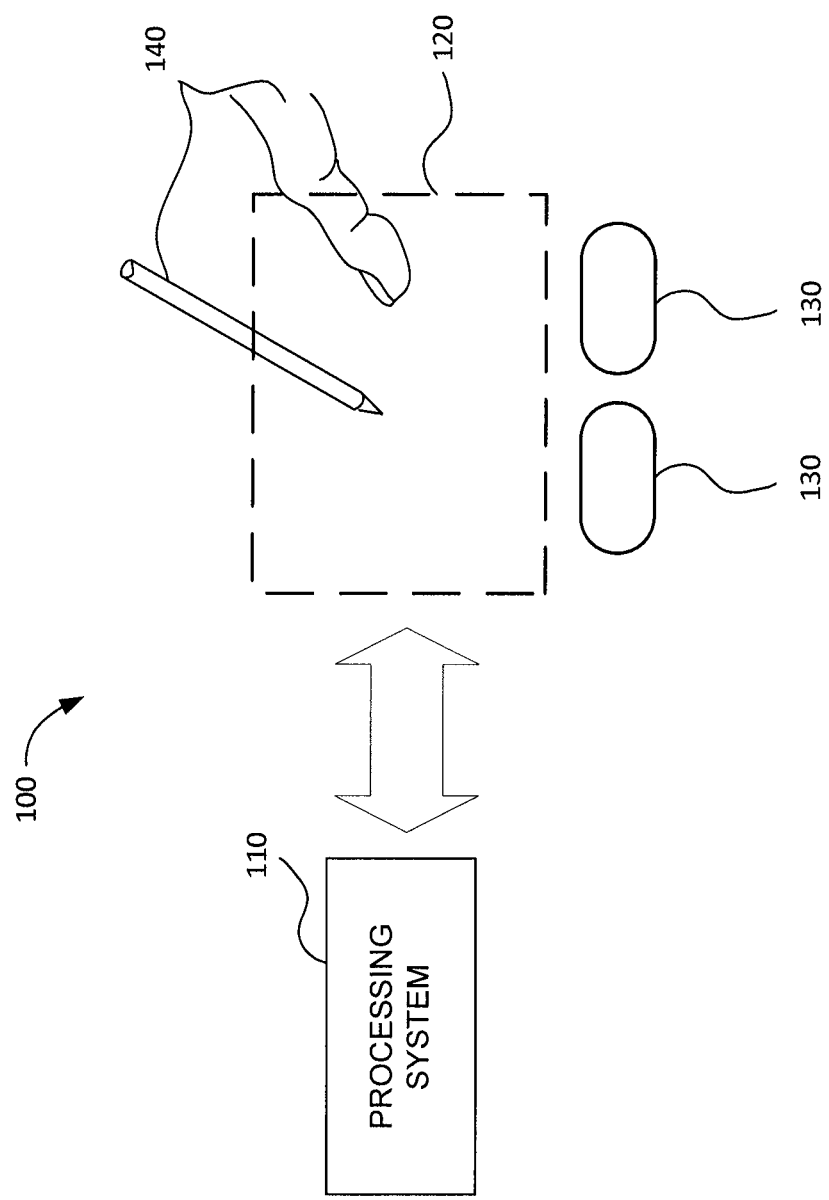
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), BLUETOOTH, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
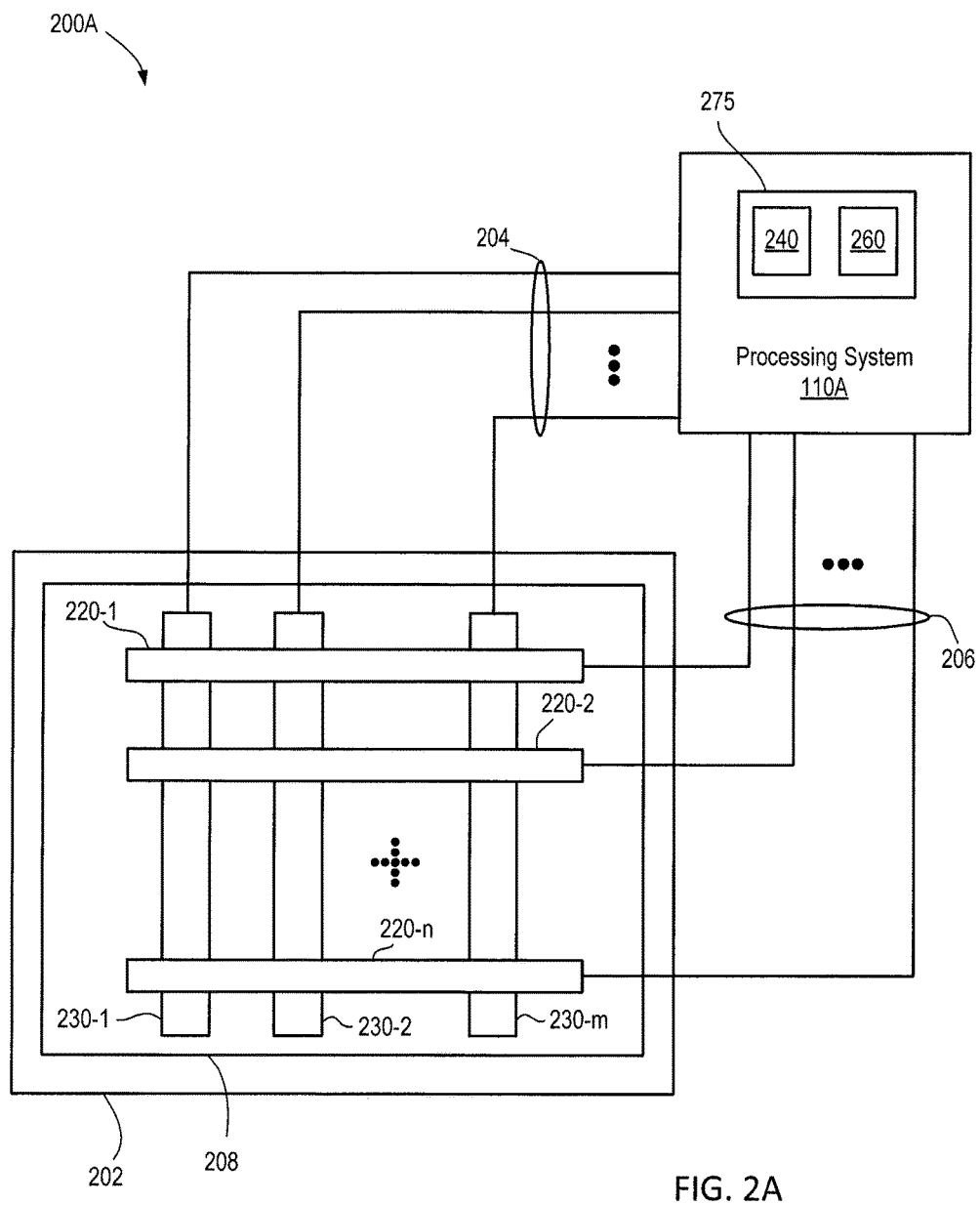
FIG. 2A is a block diagram depicting a capacitive sensor device according to an example.

FIG. 2A is a block diagram depicting a capacitive sensor device 200A according to an example. The capacitive sensor device 200A comprises an example implementation of the input device 100 shown in FIG. 1. The capacitive sensor device 200A includes a sensor electrode collection 208 coupled to an example implementation of the processing system 110 (referred to as "the processing system 110A"). As used herein, general reference to the processing system 110 is a reference to the processing system described in FIG. 1 or any other embodiment thereof described herein (e.g., the processing system 110A, 110B, etc.).

The sensor electrode collection 208 is disposed on a substrate 202 to provide the sensing region 120. The sensor electrode collection 208 includes sensor electrodes disposed on the substrate 202. In the present example, the sensor electrode collection 208 includes two pluralities of sensor electrodes 220-1 through 220-N (collectively "sensor electrodes 220"), and 230-1 through 230-M (collectively "sensor electrodes 230"), where M and N are integers greater than zero. The sensor electrodes 220 and 230 are separated by a dielectric (not shown). The sensor electrodes 220 and the sensor electrodes 230 can be non-parallel. In an example, the sensor electrodes 220 are disposed orthogonally with the sensor electrodes 230.

In some examples, the sensor electrodes 220 and the sensor electrodes 230 can be disposed on separate layers of the substrate 202. In other examples, the sensor electrodes 220 and the sensor electrodes 230 can be disposed on a single layer of the substrate 202. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

In the present example, the sensor electrode collection 208 is shown with the sensor electrodes 220, 230 generally arranged in a rectangular grid of intersections of orthogonal sensor electrodes. It is to be understood that the sensor electrode collection 208 is not limited to such an arrangement, but instead can include numerous sensor patterns. Although the sensor electrode collection 208 is depicted as rectangular, the sensor electrode collection 208 can have other shapes, such as a circular shape.

As discussed below, the processing system 110A can operate the sensor electrodes 220, 230 according to a plurality of excitation schemes, including excitation scheme(s) for mutual capacitance sensing ("transcapacitive sensing") and/or self-capacitance sensing ("absolute capacitive sensing"). In a transcapacitive excitation scheme, the processing system 110A drives the sensor electrodes 230 with transmitter signals (the sensor electrodes 230 are "transmitter electrodes"), and receives resulting signals from the sensor electrodes 220 (the sensor electrodes 220 are "receiver electrodes"). In some embodiments, sensor electrodes 220 may be transmitter electrodes and sensor electrodes 230 may be receiver electrodes. The sensor electrodes 230 can have the same or different geometry as the sensor electrodes 220. In an example, the sensor electrodes 230 are wider and more closely distributed than the sensor electrodes 220, which are thinner and more sparsely distributed. Similarly, in an embodiment, sensor electrodes 220 may be wider and/or more sparsely distributed. Alternatively, the sensor electrodes 220, 230 can have the same width and/or the same distribution.

The sensor electrodes 220 and the sensor electrodes 230 are coupled to the processing system 110A by conductive routing traces 204 and conductive routing traces 206, respectively. The processing system 110A is coupled to the sensor electrodes 220, 230 through the conductive routing traces 204, 206 to implement the sensing region 120 for sensing inputs. Each of the sensor electrodes 220 can be coupled to at least one routing trace of the routing traces 206. Likewise, each of the sensor electrodes 230 can be coupled to at least one routing trace of the routing traces 204.

Figure 2B:
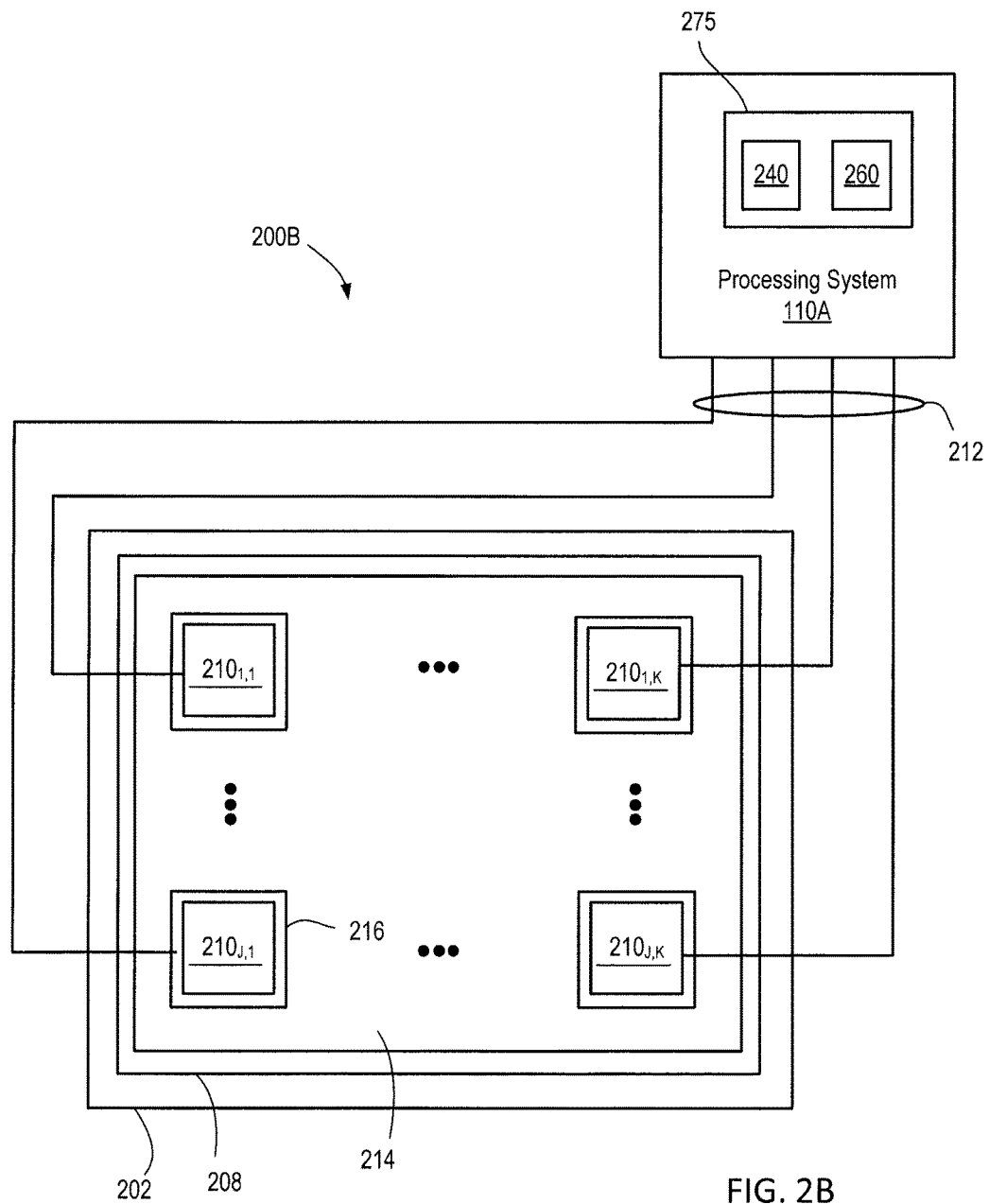
FIG. 2B is a block diagram depicting another capacitive sensor device according to an example.

FIG. 2B is a block diagram depicting a capacitive sensor device 200B according to an example. The capacitive sensor device 200B comprises another example implementation of the input device 100 shown in FIG. 1. In the present example, the sensor electrode collection 208 includes a plurality of sensor electrodes $210_{1,1}$ through $210_{J,K}$, where J and K are integers (collectively "sensor electrodes 210"). The sensor electrodes 210 are ohmically isolated from each other and the grid electrode 214. The sensor electrodes 210 can be separated from the grid electrode 214 by a gap 216. In the present example, the sensor electrodes 210 are arranged in a rectangular matrix pattern, where at least one of J or K is greater than zero. The sensor electrodes 210 can be arranged in other patterns, such as polar arrays, repeating patterns, non-repeating patterns, or like type arrangements. In various embodiments, the grid electrode(s) is optional and may not be included. Similar to the capacitive sensor device 200A, the processing system 110A can operate the sensor electrodes 210 and the grid electrode 214 according to a plurality of excitation schemes, including excitation scheme(s) for transcapacitive sensing and/or absolute capacitive sensing.

In some examples, the sensor electrodes 210 and the grid electrode 214 can be disposed on separate layers of the substrate 202. In other examples, the sensor electrodes 210 and the grid electrode 214 can be disposed on a single layer of the substrate 202. The sensor electrodes 210 can be on the same and/or different layers as the sensor electrodes 220 and the sensor electrodes 230. While the sensor electrodes are shown disposed on a single substrate 202, in some embodiments, the sensor electrodes can be disposed on more than one substrate. For example, some sensor electrodes can be disposed on a first substrate, and other sensor electrodes can be disposed on a second substrate adhered to the first substrate.

The sensor electrodes 210 are coupled to the processing system 110A by conductive routing traces 212. The processing system 110A can also be coupled to the grid electrode 214 through one or more routing traces (not shown for clarity). The processing system 110A is coupled to the sensor electrodes 210 through the conductive routing traces 212 to implement the sensing region 120 for sensing inputs.

Referring to FIGS. 2A and 2B, the capacitive sensor device 200A or 200B can be utilized to communicate user input (e.g., a user's finger, a probe such as a stylus, and/or some other external input object) to an electronic system (e.g., computing device or other electronic device). For example, the capacitive sensor device 200A or 200B can be implemented as a capacitive touch screen device that can be placed over an underlying image or information display device (not shown). In this manner, a user would view the underlying image or information display by looking through substantially transparent elements in the sensor electrode collection 208. When implemented in a touch screen, the substrate 202 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode collection 208.

In another example, the capacitive sensor device 200A or 200B can be implemented as a capacitive touchpad, slider, button, or other capacitance sensor. For example, the substrate 202 can be implemented with, but not limited to, one or more clear or opaque materials. Likewise, clear or opaque conductive materials can be utilized to form sensor electrodes and/or conductive routing traces for the sensor electrode collection 208.

In general, the processing system 110A excites or drives sensing elements of the sensor electrode collection 208 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110A drives sensing element(s) of the sensor electrode collection 208 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110A can determine measurement(s) of capacitance from the sensed charge. In another example, the processing system 110A drives sensing element(s) of the sensor electrode collection 208 with charge and senses resulting respective voltage on sensing element(s). That is, the sensing signal is a signal to cause accumulation of charge (e.g., current signal) and the resulting signal is a voltage signal. The processing system 110A can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110A can include a sensor module 240 and a determination module 260. The sensor module 240 and the determination module 260 comprise modules that perform different functions of the processing system 110A. In other examples, different configurations of one or more modules can perform the functions described herein. The sensor module 240 and the determination module 260 can include circuitry 275 and can also include firmware, software, or a combination thereof operating in cooperation with the circuitry 275.

The sensor module 240 selectively drives sensing signal(s) on one or more sensing elements of the sensor electrode collection 208 over one or more cycles ("excitation cycles") in accordance with one or more schemes ("excitation schemes"). During each excitation cycle, the sensor module 240 can selectively sense resulting signal(s) from one or more sensing elements of the sensor electrode collection 208. Each excitation cycle has an associated time period during which sensing signals are driven and resulting signals measured.

In one type of excitation scheme, the sensor module 240 can selectively drive sensing elements of the sensor electrode collection 208 for absolute capacitive sensing. In absolute capacitive sensing, the sensor module 240 drives selected sensing element(s) with an absolute sensing signal and senses resulting signal(s) from the selected sensing element(s). In such an excitation scheme, measurements of absolute capacitance between the selected sensing element(s) and input object(s) are determined from the resulting signal(s). In an example, the sensor module 240 can drive selected sensor electrodes 220, and/or selected sensor electrodes 230, with an absolute sensing signal. In another example, the sensor module 240 can drive selected sensor electrodes 210 with an absolute sensing signal.

In another type of excitation scheme, the sensor module 240 can selectively drive sensing elements of the sensor electrode collection 208 for transcapacitive sensing. In transcapacitive sensing, the sensor module 240 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 240 can drive the sensor electrodes 230 with transmitter signal(s) and receive resulting signals on the sensor electrodes 220. In another example, the sensor module 240 can drive selected sensor electrodes 210 with transmitter signal(s), and receive resulting signals from others of the sensor electrodes 210.

In any excitation cycle, the sensor module 240 can drive sensing elements of the sensor electrode collection 208 with other signals, including reference signals and guard signals. That is, those sensing elements of the sensor electrode collection 208 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal or absolute capacitive sensing signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200A or 200B can be located proximate to such a system ground electrode (e.g., located above a ground plane or backplane).

The determination module 260 performs capacitance measurements based on resulting signals obtained by the sensor module 240. The capacitance measurements can include changes in capacitive couplings between elements (also referred to as "changes in capacitance"). For example, the determination module 260 can determine baseline measurements of capacitive couplings between elements without the presence of input object(s). The determination module 260 can then combine the baseline measurements of capacitive couplings with measurements of capacitive couplings in the presence of input object(s) to determine changes in capacitive couplings.

In an example, the determination module 260 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode collection 208. For example, a capacitive pixel can correspond to a transcapacitive coupling between a sensor electrode 220 and a sensor electrode 230 affected by input object(s). In another example, a capacitive pixel can correspond to an absolute capacitance of a sensor electrode 210. The determination module 260 can determine an array of capacitive coupling changes using the resulting signals obtained by the sensor module 240 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110A can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 260 can perform a plurality of capacitance measurements associated with a particular axis of the sensing region 120 to create a "capacitive profile" along that axis. For example, the determination module 260 can determine an array of absolute capacitive coupling changes along an axis defined by the sensor electrodes 220 and/or the sensor electrodes 230 to produce capacitive profile(s). The array of capacitive coupling changes can include a number of points less than or equal to the number of sensor electrodes along the given axis.

Measurement(s) of capacitance by the processing system 110A, such as capacitive image(s) or capacitive profile(s), enable the sensing of contact, hovering, or other user input with respect to the formed sensing regions by the sensor electrode collection 208. The determination module 260 can utilize the measurements of capacitance to determine positional information with respect to a user input relative to the sensing regions formed by the sensor electrode collection 208. The determination module 260 can additionally or alternatively use such measurement(s) to determine input object size and/or input object type.

Figure 3:
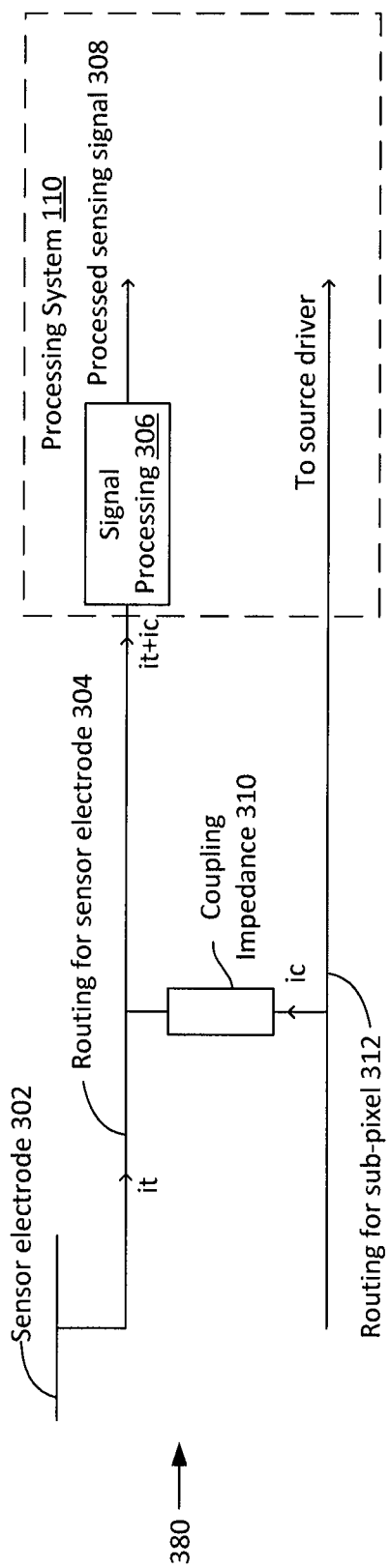
FIG. 3 is a schematic diagram of a routing configuration, according to an example.

FIG. 3 is a schematic diagram of a routing configuration 300, according to an example. As shown, the routing configuration 300 includes a routing 304 for a sensor electrode 302 (which may, for example, be a sensor electrode such as sensor electrodes 220 or sensor electrodes 230 of FIG. 2A, or sensor electrodes 210 of FIG. 2B) and a routing 312 for a sub-pixel, as well as a sensor electrode 302. Processing system 110 is coupled to sensor electrode routing 304 and sub-pixel routing 312 in order to both perform sensing and to perform display updates.

The sensor electrode routing 304 electrically couples sensor electrode 302 to signal processing unit 306 (which may be a portion of processing system 110). The sub-pixel routing 312 electrically couples a display sub-pixel (not shown) to a source driver (also not shown), which may be a part of processing system 110 of FIG. 1. Coupling impedance 310 represents a capacitive coupling between sensor electrode routing 304 and sub-pixel routing 312. The coupling impedance 310 exists due to the proximity of these two elements to each other.

In operation, processing system 110 drives sensor electrode 302 for sensing. In response, the sensor electrode 302 provides a signal to signal processing unit 306, which processes the signal to generate processed sensing signal 308, which may be processed by other elements in processing system 110 to determine presence of an input object 140 proximate to sensor electrode 302. Driving sensor electrode 302 may comprise varying the voltage at the sensor electrode 302 with respect to the input object 140 so that a current is induced on sensor electrode routing 304 that is dependent on the degree of capacitive coupling between the input object 140 (if present and/or capacitively coupled to sensor electrode 302) and sensor electrode 302. The current induced in sensor electrode routing 304 in response to driving the sensor electrode 302 is shown as "it" in FIG. 3. Note that driving the voltage at sensor electrode 302 with respect to the input object 140 might be done by maintaining the sensor electrode 402 at a fixed voltage with respect to system ground. This may be done by providing a modulated power supply that modulates the power supply and ground voltages of input device 100 with respect to an external voltage such as voltage associated with an input object 140.

The signal processing system 306 processes the current signal received on sensor electrode routing 304 to generate a processed sensing signal 308 for further processing including determination of presence of an input object 140. The signal processing system 306 includes various elements that perform functions such as sampling, signal filtering, demodulation, and the like, and can include elements such as an operational amplifier with capacitive feedback, a demodulator, a filter, and other mechanisms.

Sub-pixel routing 312, which provides signals for updating display elements (not shown), may be near to sensor electrode routing 304. When a signal is driven onto sub-pixel routing 312 by a source driver, some current is driven onto sensor electrode routing 304 due to coupling impedance 310. This current is referred to as a "corrupting current" ic.

The current that arrives at signal processing unit 306 is thus a combination of the corrupting current "ic" from sub-pixel routing 312 and the current from sensor electrode "it". Thus, the processed sensing signal 308 is affected by current induced by display updates that is unrelated to an input object 140 near sensor electrode 302. By affecting what is processed by signal processing unit 306, the corrupting current hinders the ability of processing system 110 to detect presence of an input object 140.

To improve ability to detect presence of an input object 140, techniques for removing the corrupting current are provided herein. These techniques help with making the processed signal accurately reflect an input object 140 near sensor electrode 302. In general, the techniques involve removing current ic in analog, from the signal received by signal processing unit 306, or removing a digital value corresponding to current ic from a digital signal output by processing unit 306. The techniques for removing corrupting current are described below. Note that although corrupting current is shown as being induced from a particular sub-pixel routing to a particular sensor electrode routing, techniques described herein may be used to remove corrupting current at any particular sensor electrode routing, from various other sub-pixel routings.

Note that in some embodiments, sensing and display updating are performed "simultaneously." The term "simultaneously" means that touch sensing for one or more sensor electrodes of the input device 100 is performed at the same time as display updates with one or more of the display elements of the input device 100. "Simultaneously" may also mean that sensing and display updating at least partially overlap in time. In other embodiments, sensing and display updating may be performed not simultaneously but in a single, common period. For example, display updates and sensing may be performed in a single common frame. In the single common frame, display updates and sensing may be said to be performed in two time periods that at least partially overlap.

Sensing electrodes may be integrated with display elements. For example, display elements may include two electrodes that form a capacitor with a material between the two electrodes that varies characteristics related to light transmitted through that material based on a voltage across that material. One of those electrodes provides a reference voltage against which the other electrode may apply a voltage to set the variable characteristic (e.g., light polarization direction) of the transmissive material. Setting the variable characteristic of the transmissive material may be referred to herein as "updating the display element."

Simultaneous sensing and display updating may involve updating display elements while also sensing with sensing elements integrated with those display elements. Alternatively or additionally, simultaneous sensing may involve updating display elements while sensing with sensing elements other than those that are integrated with the display elements, as well as sensing with sensing elements while updating display elements other than those that are integrated with the sensing elements.

Figure 4A:
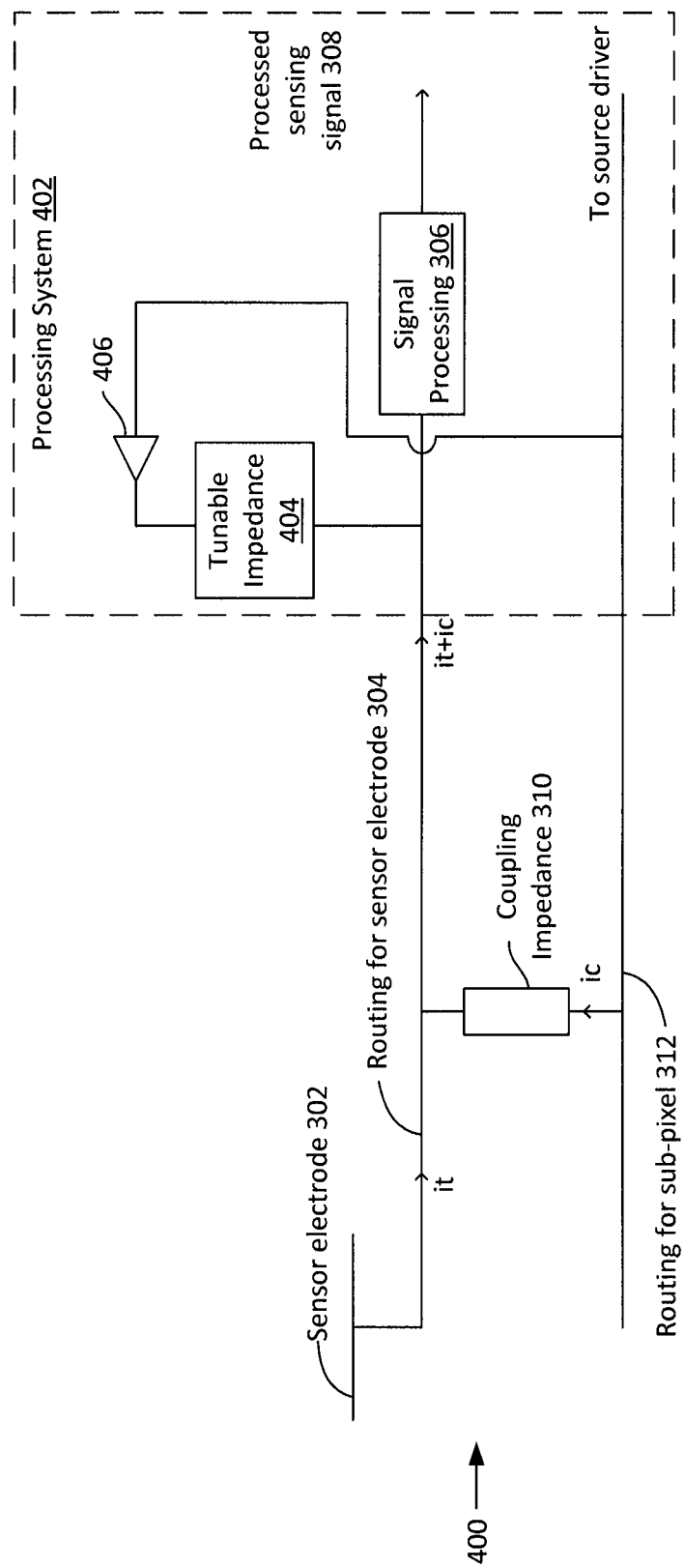
FIG. 4A is a schematic diagram of a tunable impedance-based system for removing display related interference from a sensor signal, according to an example.

FIG. 4A is a schematic diagram of a tunable impedance-based system 400 for removing display related interference from a sensor signal, according to an example. As shown, the tunable impedance-based system 400 includes a sensor electrode 302, coupled via a sensor electrode routing 304 to a signal processing unit 306, as well as a sub-pixel routing 312 that couples a sub-pixel (not shown) to a source driver (also not shown but may be part of processing system 110).

A processing system 402 may be similar to processing system 110 of FIG. 1, but includes certain additional components for removing display related interference ("corrupting components" or a "corrupting signal") from a sensor signal. Specifically, in addition to other components and functionality described above related to processing system 110, processing system includes a tunable impedance 404 that removes corrupting current ic from the signal received on sensor electrode routing 304. More specifically, tunable impedance 404 is tuned to "mirror" the impedance of coupling impedance 310 (for example, by including a variable capacitor set to a capacitance value approximately equal to that of coupling impedance 310). Note that the tunable impedance 404 may include a variable capacitor as well as other elements such as a resistor or the like.

A voltage equal to (or approximately equal to) the voltage applied by source driver to sub-pixel routing 312 is applied to an inverting circuit 406 that "inverts" the input source driver voltage with respect to the voltage at the sensor electrode routing 304. In other words, if the input of inverting circuit 406 is $V_{SD}$ volts above the voltage at the sensor electrode routing 304 $V_{SE}$, then the output of the inverting circuit is $V_{SD}$ volts below the voltage at the sensor electrode routing 304. (In absolute terms, the output of the inverting circuit 406 is $V_{SE}-(V_{SD}-V_{SE})=2V_{SE}-V_{SD}$). This inversion may be accomplished with a variety of circuits, one example of which is op-amp ("operational amplifier") based. Specifically, in one example, input $V_{SE}$ is applied to the non-inverting input of an op-amp. A resistor having resistance R is connected between the output and the inverting input of the op-amp. Input $V_{SD}$ is applied, through another resistor having resistance R, to the inverting input of the op-amp (so that resistance 2R exists between input $V_{SD}$ and the output of the op-amp, but only resistance R exists between input $V_{SD}$ and the inverting input). The output of the op-amp is $2V_{SE}-V_{SD}$. Another example of a circuit to invert the value above is an inverting amplifier. The inverted voltage is applied to tunable impedance 404, which causes current ic to be drawn from sensor electrode routing 304. In other embodiments, a portion (e.g., a fraction) of $V_{SE}$ or a portion of $V_{SD}$ is applied to tunable impedance 404.

Applying the inverted voltage to the tunable impedance 404 causes the tunable impedance 404 to draw, from the sensor electrode routing 304, current that is substantially equal to the amount of current added to sensor electrode 304 by the source driver. Thus, the corrupting component of the signal is removed before being processed by signal processing unit 306. Further, because an impedance is used that mirrors the impedance of coupling impedance 310, the waveform of the current drawn by tunable impedance 404 substantially matches that of the current added by coupling impedance 310, thereby compensating for corrupting current over time. Note that in some embodiments, if only a portion of the corrupting component of the signal is desired to be removed, then current that is a portion of the current added to the sensor electrode 304 by the source driver may be removed (for example, by scaling down techniques described herein for removing corrupting signal).

In order to cause tunable impedance 404 to match coupling impedance 310, tunable impedance 404 can be tuned. This tuning may be done at design time, because the capacitance of coupling impedance 310 depends primarily on the various parameters of the design of input device 100 (e.g., shape and position of the routings, as well as distance between routings) as opposed to variation across manufactured input devices 100.

To tune the tunable impedance 404, processing system 402 drives sensor electrode 302 for sensing when no input object 140 is near the sensor electrode 302 and when source driver is not driving the sub-pixel associated with sub-pixel routing 312 for display updates. A processed sensing signal 308, output from signal processing unit 306 is obtained. This processed sensing signal 308 is reflective of sensing with sensor electrode 302 with no input object 140 present and with no corruption current. Subsequently, sensor electrode 302 is driven for sensing while also applying a source driver voltage on sub-pixel routing 312, with tunable impedance 404 at some initial "guess" value. If the processed sensing signal 308 is not equal to the processed sensing signal 308 obtained with no input object 140 or source driver signal, then tunable impedance 404 is varied and sensor electrode 302 is driven again. The obtained processed sensing signal 308 is again compared with the initial processed sensing signal 308 and if still unequal, tunable impedance is varied again 404. Tunable impedance is varied in this manner, each time driving sensor electrode 302 while driving sub-pixel routing 312 until the initial processed sensing signal 308 and the most recently obtained processed sensing signal 308 matches. Note that this tuning technique may be performed at design time, meaning that once an impedance value is obtained for impedance 404, input devices 100 may be created with a fixed impedance value equal (or approximately equal) to the determined impedance value. Thus, in some embodiments, tunable impedance 404 may be a fixed impedance (e.g., a capacitor which naturally has some resistance) having an impedance value that is tuned (for example, as described above).

Figure 4B:
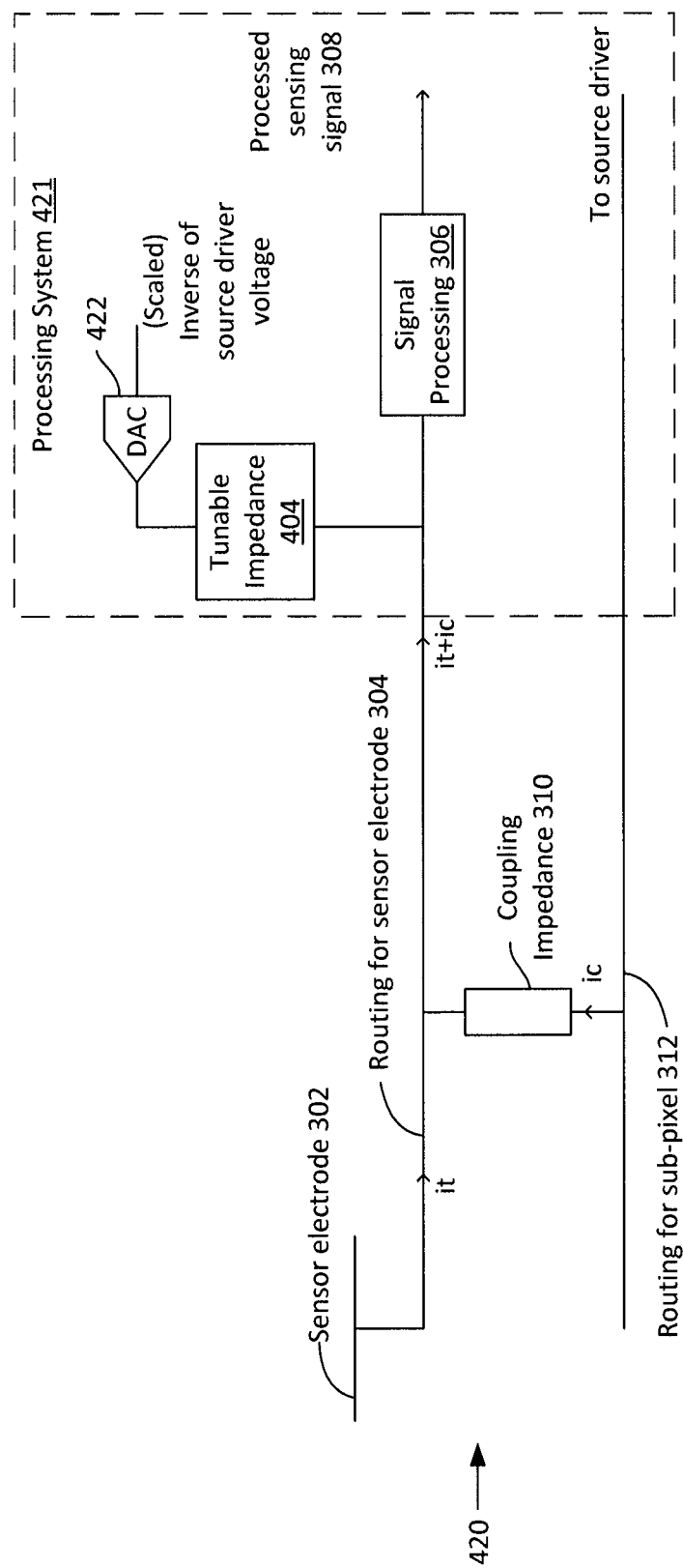
FIG. 4B is a schematic diagram of a digital-input tunable impedance-based system, according to another example.

FIG. 4B is a schematic diagram of a digital-input tunable impedance-based system 420, according to another example. The digital-input tunable impedance-based system 420 is similar to the tunable impedance-based system 400 of FIG. 4A except that instead of using the inverted source driver voltage as input to the tunable impedance 404, a digital-to-analog converter 422 converts a digital value to a voltage and applies that voltage to tunable impedance 404.

The processing system 421 is similar to processing system 402, but provides input to tunable impedance 404 via a DAC 422 instead of directly, via inverted source driver voltage. The input applied to the DAC 422 may be a digital value corresponding to the scaled (or non-scaled) inverse of the source driver voltage. Corrupting current is drawn from sensor electrode routing 304 in a similar manner as with the tunable impedance-based system 400 of FIG. 4A. Specifically, a particular voltage applied to tunable impedance 404 functions to remove corrupting current ic from the current provided to signal processing unit 306.

The voltage applied to the DAC 422 may be a scaled up version of the source driver voltage, which would allow tunable impedance 404 to be smaller than the coupling impedance 310, reducing the footprint of the tunable impedance 404 within processing system 110. The tunable impedance 404 can be tuned in a similar manner as with the tunable impedance-based system 400 of FIG. 4A. Specifically, a tunable impedance is chosen, a scaled voltage is applied via DAC 422 to the tunable impedance, and processing system 110 determines whether current received by signal processing unit 306 is equal to a current value received when no input object 140 is present and when the sub-pixel associated with sub-pixel routing 312 is not driven for update. The tunable impedance 404 is varied until these two values are substantially equal.

Figure 4C:
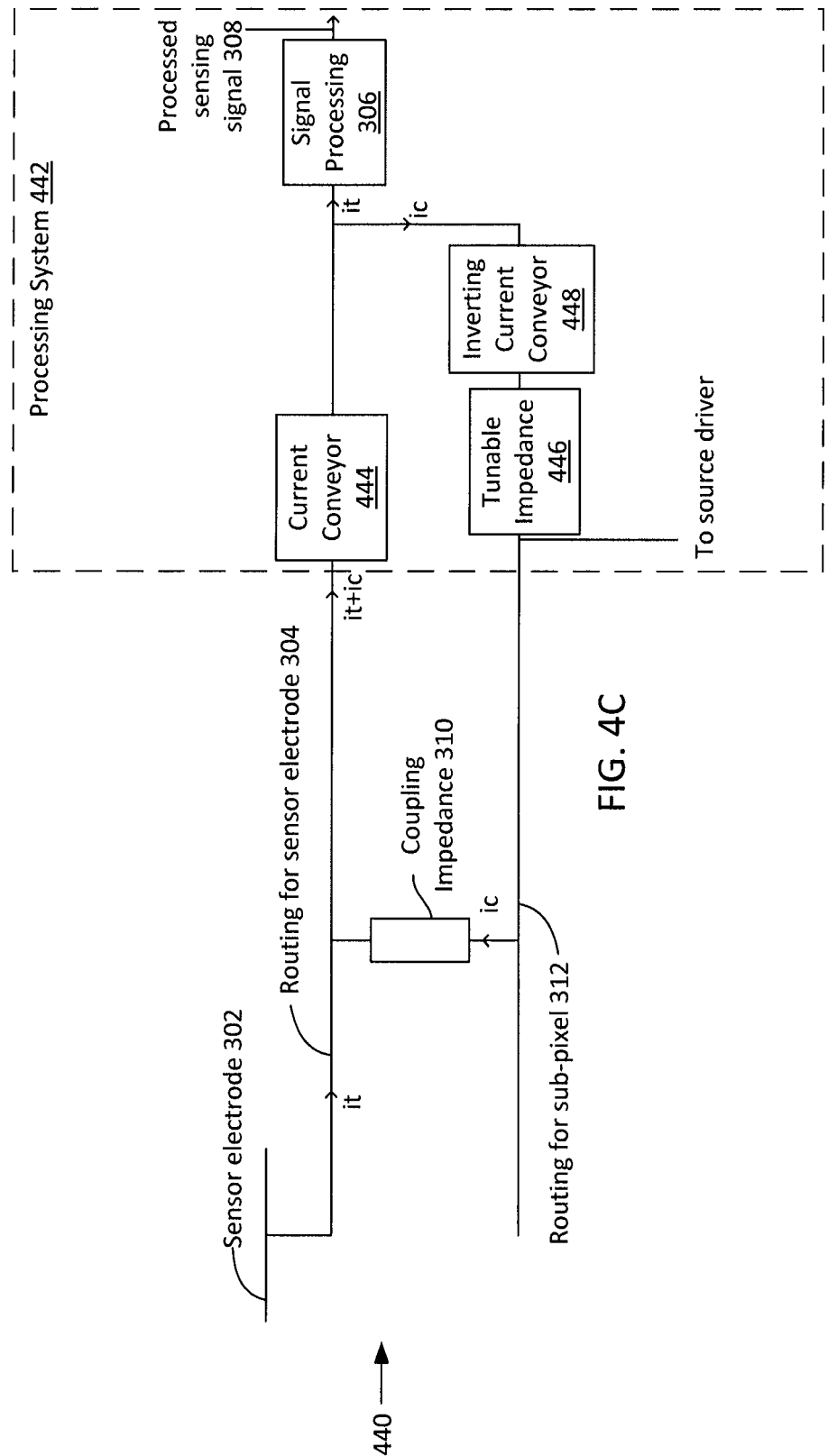
FIG. 4C is a schematic diagram of a current conveyor-based system for removing display related interference from a sensor signal, according to an example.

FIG. 4C is a schematic diagram of a current conveyor-based system 440 for removing display related interference from a sensor signal, according to an example. As shown, the current conveyor-based system 440 includes a sensor electrode 302, coupled via a sensor electrode routing 304 to a signal processing unit 306, as well as a sub-pixel routing 312 that couples a sub-pixel (not shown) to a source driver (also not shown but may be part of processing system 110).

Processing system 442 includes similar components and performs similar functionality as processing system 110 but also includes several elements for removing a corrupting current associated with display elements from a signal received over sensor electrode routing 304. Specifically, processing system 110 includes a current conveyor 444, a tunable impedance 446, and an inverting current conveyor 448.

The current conveyor 444 replicates the current received at its input (the side connected to the sensor electrode 302), at its output. Tunable impedance 446 is tuned to generate current equal to ic, which is provided to an input of inverting current conveyor 448. Inverting current conveyor inverts ic, thus drawing ic from the output of current conveyor 444, leaving current it as the input to signal processing unit 306.

As with system 400 and system 420, tunable impedance 446 can be tuned by driving sensor electrode 302 when not driving source driver and when no input object 140 is present to determine a clean signal with no corruption current. Subsequently, processing system 442 drives sensor electrode 302 when driving source driver but with no input object 140 present, varying tunable impedance 446 until the signal received when driving while driving with source driver matches that received when driving without driving source driver. Some benefits of the current conveyor-based system 440 include reduced physical space utilized as compared with some other circuit types.

Figure 4D:
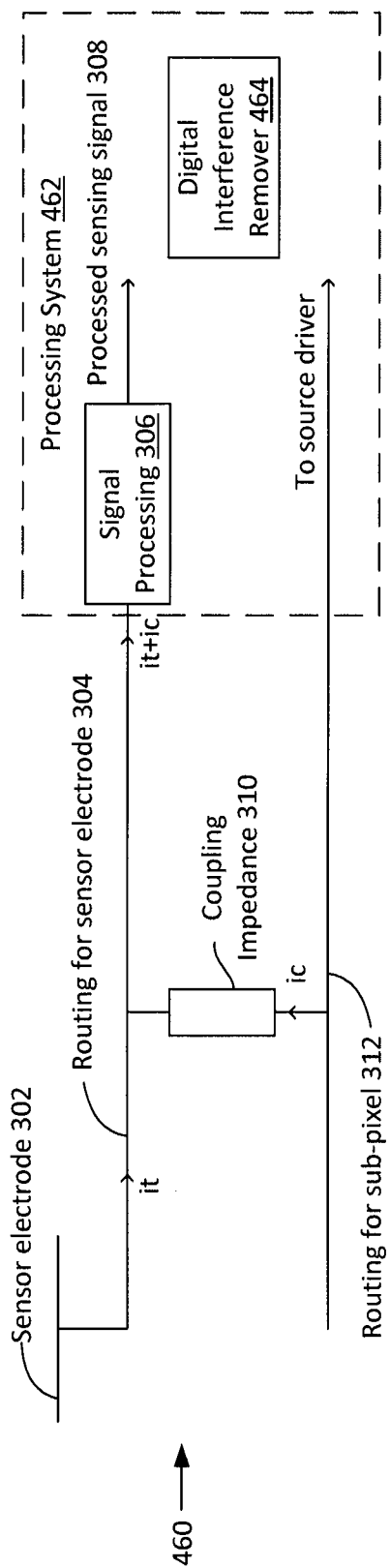
FIG. 4D is a schematic diagram of a digital-based system for removing display related interference from a sensor signal, according to an example.

FIG. 4D is a schematic diagram of a digital-based system 460 for removing display related interference from a sensor signal, according to an example. The digital-based system 460 includes all of the components of processing system 110 illustrated in FIG. 3 but also includes a digital interference remover 464. The digital interference remover 464 digitally removes components of a signal related to corrupting current. More specifically, signal processing unit 306 processes a received signal, which is it+ic, and generates a processed sensing signal 308. This processed sensing signal is a digital signal related to the input signal it+ic. This digital signal is referred to herein as an "analog-to-digital value" or an "ADC value," since the digital signal is a value that results from converting an analog signal to a digital value. Digital interference remover 464 removes components of this digital signal related to ic so that all that is left is the signal associated with current it.

More specifically, digital interference remover 464 determines a value to subtract from the ADC value by determining a value corresponding to corrupting current ic. This value is equal to the source driver voltage convolved with the impulse response of the circuitry from the source driver to the output of signal processing unit 306. The impulse response is the output of the signal processing unit 306 when a delta function is applied to the source driver end of the sub-pixel routing 312, where the source driver end refers to the part of the sub-pixel routing 312 that is coupled to the source driver. Note that impulse responses can be determined by driving a particular corruption signal-inducing element (e.g., the sub-pixel routing 312) with a reference signal (e.g., a step signal having a voltage change of 1 Volt) while not driving the associated sensor electrode 302 for capacitive sensing, and recording the ADC values output from signal processing unit 306 over time. This output is actually the step response, since a delta function necessary for generating an impulse response is not practical to generate. To obtain the impulse response, the derivative of the step response is calculated.

The convolution described above produces a result that indicates how much of the ADC value is associated with coupling impedance 310. This result varies over time, so a value is selected that corresponds to the time that the ADC value is output from signal processing unit 306. To arrive at a distortion-less signal, digital interference remover 464 subtracts, from the ADC value in question, the selected value of the convolution function. This subtraction can be done for each ADC, so that each ADC output from signal processing unit 306 has contributions from coupling impedance 310 removed.

Mathematically, the operation of removing corrupting current signal from the ADC can be expressed as follows:

$$O(t)=ADC(t)-CF(t), \text{ where}$$

CF(t)=(source driver signal) convolved with (impulse response), at time t;

O(t) is the clean output value without a corrupting signal, at time t; and

ADC(t) is the ADC value at time t.

Convolution is generally performed as follows:

$$\text{Convolution function}=\int a_i b_i dt,$$

where ai is a value from the source driver and bi is a value from the impulse response.

In discrete time convolution is performed as follows:

$$\text{Convolution function}=\Sigma_1^n a_i b_i,$$

where ai is a value from the source driver and bi is a value from the impulse response, and where 1 and n are the range over which convolution is being performed.

Note that FIG. 4D illustrates a single sub-pixel routing 312 providing a single current through a single coupling impedance 310 to sensor electrode routing 304. However, other display-related elements of input device 100 may capacitively induce current flow in sensor electrode routing 304. Thus, the signal received by signal processing unit 306 and the output ADC signal may include components related to multiple capacitive couplings.

To remove corrupting signal components for each of these capacitive couplings, digital interference remover 464 calculates the source voltage convolved with the impulse response for each capacitive coupling to the receiver being analyzed and subtracts the resulting value from the ADC value for each capacitive coupling to the receiver being analyzed. Thus, for any particular receiver, multiple values are subtracted from the ADC value to arrive at a value having no components from such corrupting capacitive couplings.

For any particular sensor electrode routing 304, an impulse response may be calculated for any other component that capacitively induces a signal on that sensor electrode routing 304. For example, different sub-pixel routings 312, gate driver routings (not shown) that provide signals to gates of sub-pixel transistors for row selection, and other conductive elements may capacitively couple to a particular sensor electrode routing 304. Impulse responses may be calculated for each such element. To improve the processing performance of the unit which performs the above mentioned calculations (e.g., digital interference remover 464), that unit may consider only a limited set of impulse responses. For example, the calculating unit may consider only the top X number of impulse responses with the highest values (e.g., the four impulse responses with the highest values), may only consider impulse responses with values that are at least a threshold percentage (e.g., 5%) of the highest impulse response value, or may only consider impulse responses for input device elements that are physically closest to the sensor electrode routing 304. Again, compensating for signals associated with these impulse responses would involve convolving the impulse response with the voltage signal driven on the associated input device element, and subtracting the result of the convolution from the output ADC value, noting that multiple such results can be subtracted—one for each coupling for which convolution is performed.

Figure 5:
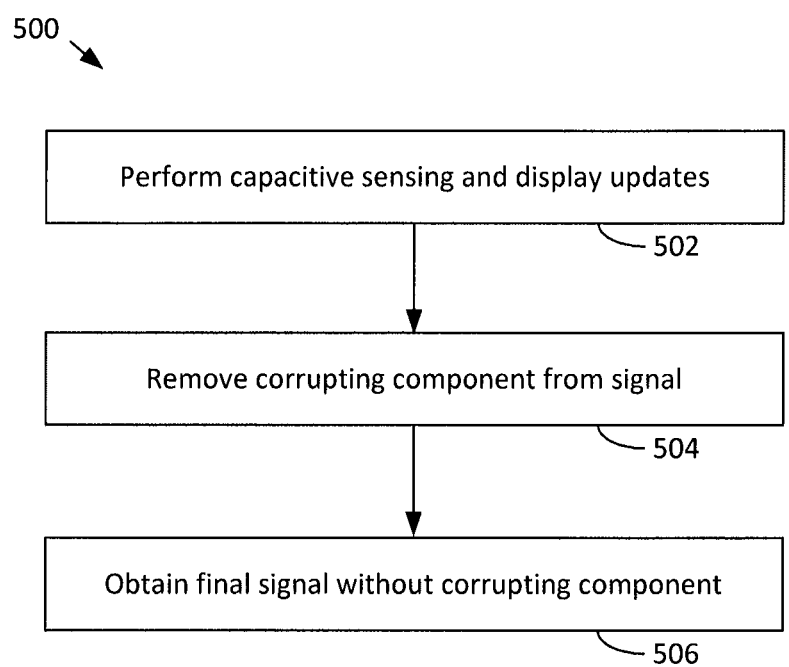
FIG. 5 is a flow diagram of a method for removing corrupting contribution generated by display elements from a sensing signal, according to an example.

FIG. 5 is a flow diagram of a method 500 for removing corrupting contribution generated by display elements from a sensing signal, according to an example. Although described with respect to the system of FIGS. 1-3 and 4A-4D, those of skill in the art will understand that any system configured to perform the steps in various alternative orders is within the scope of the present disclosure.

As shown, the method 500 begins at step 502, where processing system 110 performs capacitive sensing and display updates. The capacitive sensing and display updates may be performed simultaneously, or nearly simultaneously such as within a single common frame. Because a sub-pixel routing 312 may be proximate to the sensor electrode routing 304, an unwanted, "corrupting current" may be induced in sensor electrode 304.

At step 504, processing system removes the corrupting component from the signal. This may be done in analog or in digital. In analog, a tunable capacitance may be driven with a voltage that is the inverse of the signal applied to the sub-pixel routing 312, thereby drawing current off of the sensor electrode routing 304 that is substantially equivalent to the current induced on the sensor electrode routing 304 by the sub-pixel routing 312. A digital-to-analog converter may be used to generate the voltage that is applied to the tunable capacitance so that the voltage can be scaled in order to reduce the capacitance value and thus the size of the tunable capacitance. Alternatively, an inverting current conveyor may be coupled to a tunable impedance which is coupled to the source driver. This inverting current conveyor can draw current from a signal output by a non-inverting current conveyor that is coupled to the sensor electrode routing 304. For digital removal of the corrupting component, a digital interference remover 464 calculates a digital value associated with the corrupting component. This digital value is calculated by convolving the source driver signal with an impulse response.

At step 506, processing system 110 obtains a final signal without the corrupting component. In analog, this is done by simply applying the signal, with the corrupting current removed, to the signal processing unit 306 to obtain an ADC value. In digital, obtaining the final signal is done by subtracting the corrupting component from the ADC value output by the signal processing unit 306.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system configured for simultaneously updating a display and performing capacitive sensing, the processing system comprising:
  a source driver configured to:
    drive a source line with a reference voltage during a first time period in which a sensor electrode is not driven for capacitive sensing to produce first resulting signals on a routing trace coupled to the sensor electrode; and
    drive the source line with a source driver signal during a second time period to produce second resulting signals on the routing trace during a third time period that at least partially overlaps with the second time period, the routing trace and the source line being routed proximate each other;
  an analog-to-digital converter configured to:
    receive the first resulting signals and generate a first digital signal representing the first resulting signals; and
    receive the second resulting signals and generate a second digital signal representing the second resulting signals; and
  an interference remover configured to remove source driver effects in the second resulting signals that exist due to driving the source line with the source driver signal by:
    determining at least one impulse response, associated with receiver circuitry configured to process the first resulting signals, based on the first digital signal;
    receiving the second digital signal;
    calculating an interference value based on the source driver signal and the determined at least one impulse response; and
    subtracting the calculated interference value from the second digital signal.

2. The processing system of claim 1, wherein the interference remover is configured to calculate the interference value by:
  convolving the determined at least one impulse response with the source driver signal.

3. The processing system of claim 1, wherein:
  the interference remover is configured to:
    determine a second impulse response associated with receiver circuitry configured to process fourth resulting signals produced by a second source driver signal applied on a second source line, proximate the routing trace; and
    calculate the interference value further based on the second source driver signal and the determined second impulse response.

4. The processing system of claim 1, wherein:
  the source line and the routing trace are disposed in a common layer.

5. The processing system of claim 1, wherein:
  the source line and the routing trace are disposed in separate layers; and
  the source line is parallel to the routing trace.

6. The processing system of claim 1, wherein the interference remover includes:
  a capacitor.

7. The processing system of claim 6, wherein the interference remover further comprises:
  a digital-to-analog converter configured to: scale and negate a voltage associated with the source driver signal to generate a scaled signal; and apply the scaled signal to the capacitor to generate the interference value.

8. An input device configured for simultaneously updating a display and performing capacitive sensing, the input device comprising:
  a sensor electrode coupled to a routing trace;
  a display element coupled to a source line, the source line and the routing trace being routed proximate each other; and
  a processing system coupled to the routing trace and the source line, the processing system comprising:
    a source driver configured to:
      drive the source line with a reference voltage during a first time period in which the sensor electrode is not driven for capacitive sensing to produce first resulting signals on the routing trace; and
      drive the source line with a source driver signal during a second time period to produce second resulting signals on the routing trace during a third time period that at least partially overlaps with the second time period,
    an analog-to-digital converter configured to:
      receive the first resulting signals and generate a first digital signal representing the resulting signals; and
      receive the second resulting signals and generate a second digital signal representing the second resulting signals; and
    an interference remover configured to remove source driver effects in the second resulting signals that exist due to driving the source line with the source driver signal by:
      determining at least one impulse response, associated with receiver circuitry configured to process the first resulting signals, based on the first digital signal;
      receiving the second digital signal;
      calculating an interference value based on the source driver signal and the determined at least one impulse response; and
      subtracting the calculated interference value from the second digital signal.

9. The input device of claim 8, wherein the interference remover is configured to calculate the interference value by:
  convolving the determined at least one impulse response with the source driver signal.

10. The input device of claim 8, wherein the interference remover is configured to:
  determine a second impulse response associated with receiver circuitry configured to process fourth resulting signals produced by a second source driver signal applied on a second source line, proximate the routing trace; and
  calculate the interference value further based on the second source driver signal and the determined second impulse response.

11. The input device of claim 8, wherein:
  the source line and the routing trace are disposed in a common layer.

12. The input device of claim 8, wherein:
  the source line and the routing trace are disposed in separate layers; and
  the source line is parallel to the routing trace.

13. The input device of claim 8, wherein the interference remover includes:
   a capacitor.

14. The input device of claim 13, wherein the interference remover further comprises:
   a digital-to-analog converter configured to: scale and negate a voltage associated with the source driver signal to generate a scaled signal; and apply the scaled signal to the capacitor to generate the interference value.

15. A method for simultaneously updating a display and performing capacitive sensing, the method comprising:
   driving a source line with a reference voltage during a first time period in which a sensor electrode is not driven for capacitive sensing to produce first resulting signals on a routing trace coupled to the sensor electrode, the routing trace and the source line being routed proximate each other;
   driving the source line with a source driver signal during a second time period to produce second resulting signals on the routing trace during a third time period that at least partially overlaps with the second time period;
   receiving the first resulting signals;
   generating a first digital signal representing the first resulting signals;
   determining at least one impulse response, associated with receiver circuitry configured to process the first resulting signals, based on the first digital signal;
   receiving the second resulting signals;
   generating a second digital signal representing the second resulting signals; and
   removing source driver effects in the second resulting signals that exist due to driving the source line with the source driver signal by:
      receiving the second digital signal;
      calculating an interference value based on the source driver signal and the determined at least one impulse response; and
      subtracting the calculated interference value from the second digital signal.

16. The processing system of claim 1, wherein:
   the reference voltage comprises a step signal, and
   determining the at least one impulse response comprises calculating a derivative of the first digital signal.

\* \* \* \* \*